(12) United States Patent
Marks et al.

(10) Patent No.: US 8,163,347 B2
(45) Date of Patent: Apr. 24, 2012

(54) HIGH ENERGY DENSITY NANOCOMPOSITES AND RELATED METHODS OF PREPARATION

(75) Inventors: Tobin J. Marks, Evanston, IL (US); Michael T. Lanagan, State College, PA (US); Neng Guo, Woodridge, IL (US); Sara A DiBenedetto, Wilmette, IL (US)

(73) Assignees: Northwestern University, Evanston, IL (US); The Penn State Research Foundation, University Park, PA (US)

( * ) Notice: Subject to any disclaimer, the term of this patent is extended or adjusted under 35 U.S.C. 154(b) by 0 days.

(21) Appl. No.: 11/985,930

(22) Filed: Nov. 19, 2007

(65) Prior Publication Data

US 2008/0166483 A1 Jul. 10, 2008

Related U.S. Application Data

(60) Provisional application No. 60/859,873, filed on Nov. 17, 2006.

(51) Int. Cl.
*B05D 3/10* (2006.01)
(52) U.S. Cl. ........ 427/301; 427/215; 427/216; 427/217; 427/220; 427/384
(58) Field of Classification Search .................. 427/343, 427/215, 216, 217, 220, 301, 384
See application file for complete search history.

(56) References Cited

U.S. PATENT DOCUMENTS

| | | | |
|---|---|---|---|
| 6,465,543 B1 * | 10/2002 | Alexandre et al. | 523/213 |
| 2002/0004556 A1 | 1/2002 | Foulger et al. | |
| 2004/0105810 A1 * | 6/2004 | Ren et al. | 423/624 |
| 2004/0152591 A1 | 8/2004 | Jin et al. | |
| 2004/0198888 A1 | 10/2004 | Gash et al. | |
| 2005/0049140 A1 * | 3/2005 | Holtcamp | 502/102 |
| 2005/0136292 A1 | 6/2005 | Mariani et al. | |
| 2005/0165183 A1 | 7/2005 | McCullough et al. | |
| 2006/0122308 A1 | 6/2006 | Wermter et al. | |

OTHER PUBLICATIONS

Steinmetz et al. "Polypropylene growth on silica-supported metallocene catalysts: A microscopic study to explain kinetic behavior especially in early polymerization stages" Acta Polymerica vol. 48, Issue 9 Mar. 11, 2003.*
Xalter et al. "Online Monitoring of Polyolefin Particle Growth in Catalytic Olefin Slurry Polymerization by Means of Lasentec Focused Beam Reflectance Measurement (FBRM) and Video Microscopy (PVM) Probes" Macromolecular Reaction Engineering 2010 4, 25-39.*

* cited by examiner

*Primary Examiner* — Robert S Walters, Jr.
(74) *Attorney, Agent, or Firm* — Reinhart Boerner Van Deuren s.c.

(57) ABSTRACT

Disclosed are metal oxide-polymer composites having a substrate comprising a metal oxide component, an aluminum oxide component, and a metallocene olefin polymerization catalyst component coupled to the substrate. The compositions can be used as thin films in an insulator device. Also disclosed is a method of preparing such compositions.

7 Claims, 10 Drawing Sheets

Octene% = 25.0%

Figure 1:
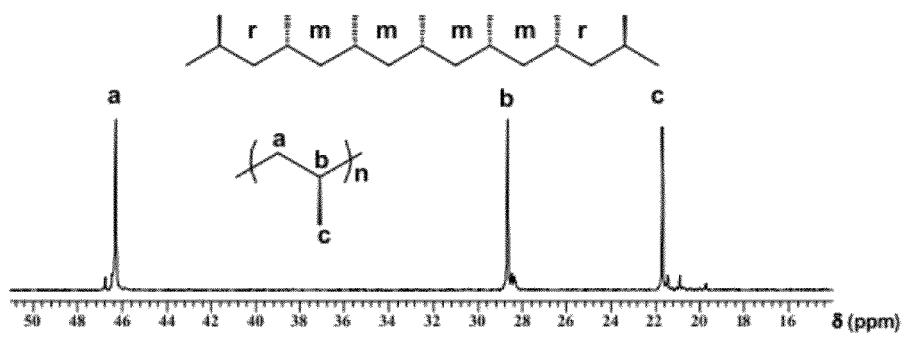

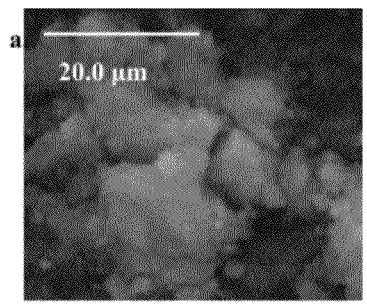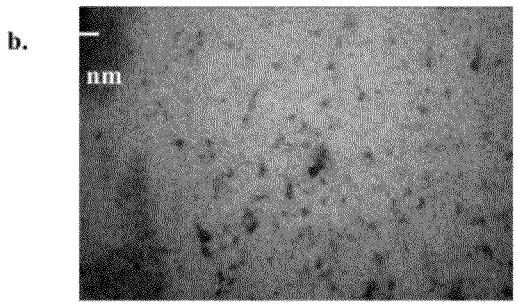
Figures 4A-B
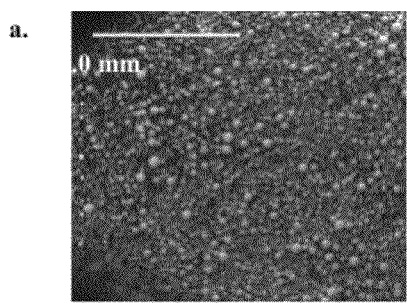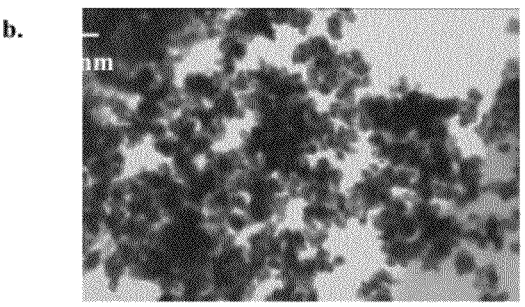
Figures 5A-B
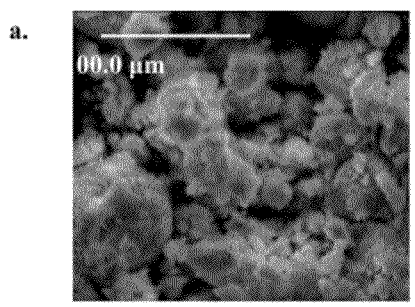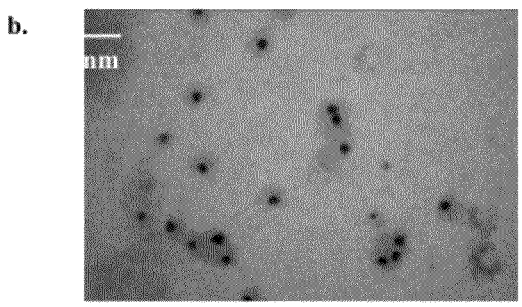
Figures 6A-B

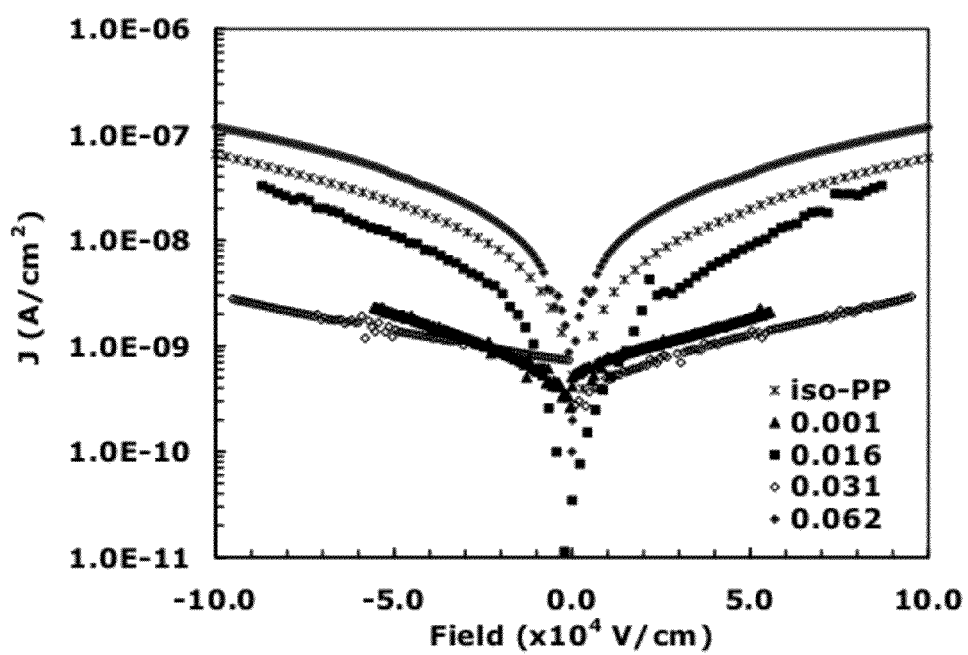

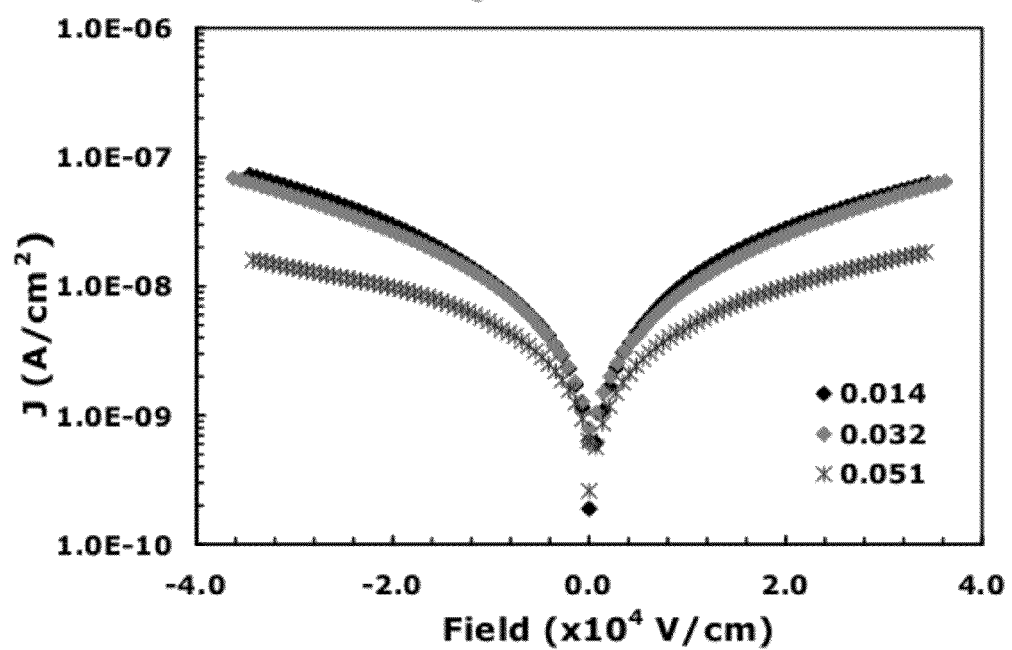

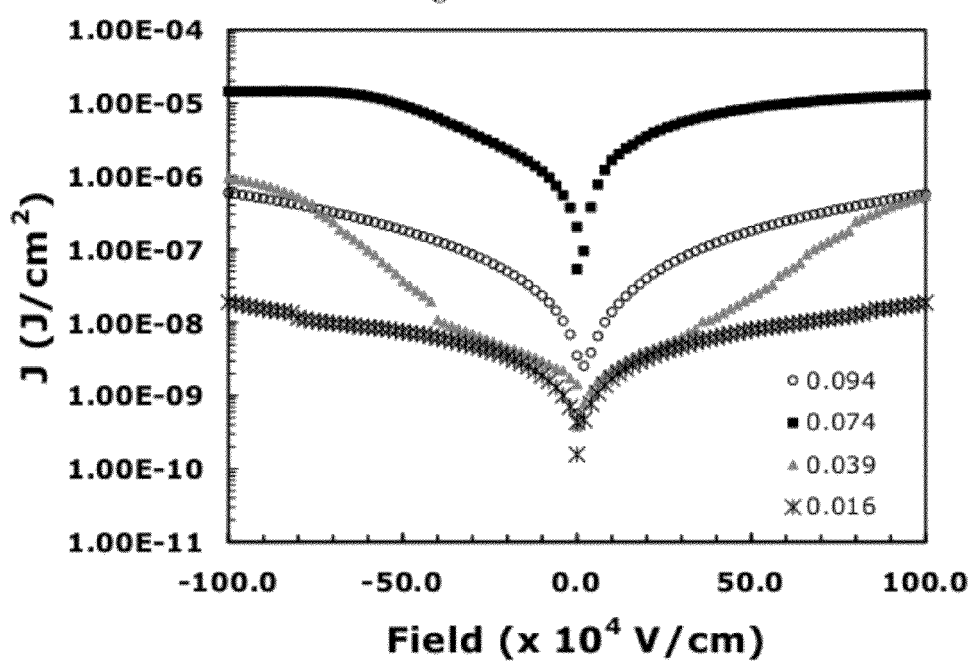

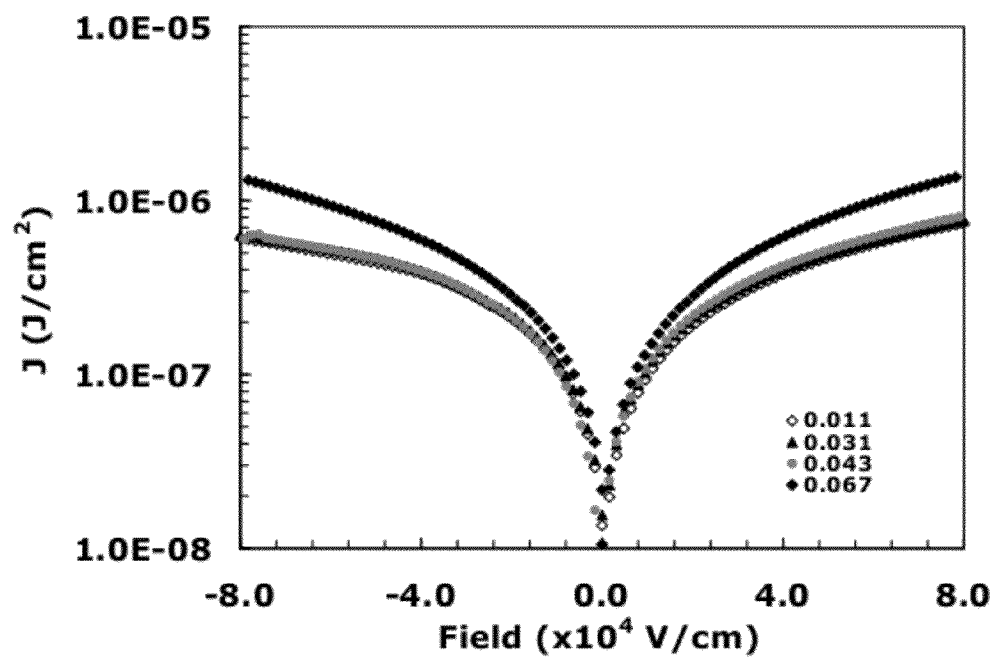

HIGH ENERGY DENSITY NANOCOMPOSITES AND RELATED METHODS OF PREPARATION

This application claims priority benefit of provisional application Ser. No. 60/859,873 filed on Nov. 17, 2006, the entirety of which is incorporated herein by reference.

The United States Government has certain rights to this invention pursuant to Grant No. N00014-05-1-0766 from the Office of Navel Research to Northwestern University.

BACKGROUND OF THE INVENTION

Future pulsed-power and power electronic capacitors will require dielectric materials ultimately having energy storage densities >30 J/cm$^3$, with operating voltages >10 kV, and msec-μsec charge/discharge times with reliable operation near the dielectric breakdown limit. Importantly, at 2 J/cm$^3$ and 0.2 J/cm$^3$, respectively, the operating characteristics of current state-of-the-art pulsed power and power electronic capacitors, which utilize either ceramics or polymers as dielectric materials, remain significantly short of this goal. An order of magnitude improvement in energy density will require development of revolutionary new materials that substantially increase intrinsic dielectric energy densities while operating reliably near the dielectric breakdown limit. For simple linear response dielectric materials, energy density is defined in eq. 1, where $\in_r$ is relative dielectric permittivity, E is the dielectric breakdown strength, and $\in_0$ is the vacuum permittivity. Generally, inorganic metal oxides exhibit high permittivities, however, they suffer from low breakdown fields. While organic materials (e.g., polymers) can provide high breakdown strengths, their generally low permittivities have limited their application.

$$U_e = \frac{1}{2}\in_r \in_0 E^2 \quad (1)$$

Recently, inorganic-polymer nanocomposite materials have attracted great interest due to their potential for high energy density. By integrating the complementary properties of their constituents, such materials can simultaneously derive high permittivity from the inorganic inclusions and high breakdown strength, mechanical flexibility, facile processability, light weight, and properties tunability (molecular weight, comonomer incorporation, thermal properties, etc.) from the polymer host matrix. Additionally, there are good reasons to believe that the large inclusion-matrix interfacial areas will afford higher polarization levels, dielectric response, and breakdown strength.

Although inorganic-polymer nanocomposites can be prepared via mechanical blending, solution mixing, in situ radical polymerization, and in situ nanoparticle synthesis, host-guest incompatibilities frequently result in nanoparticle aggregation and phase separation, detrimental to the electrical properties. Covalently grafting polymer chains to inorganic nanoparticle surfaces has also proven promising, leading to more effective dispersion and enhanced properties, however, such processes may not be cost-effective and nor easily scaled up.

Illustrating another approach, in the large-scale heterogeneous or slurry olefin polymerizations practiced on a huge industrial scale, SiO$_2$ is generally used as the catalyst support. However, very large local hydraulic pressures arising from the growing polyolefin chains are known to effect extensive SiO$_2$ particle fracture and lead to SiO$_2$-polyolefin composites. As a result, there remains an on-going search in the art for an alternate route to inorganic-polymer nanocomposites, to better utilize the benefits and advantages afforded by such materials.

SUMMARY OF THE INVENTION

In light of the foregoing, it is an object of the present invention to provide various high energy nanocomposites, related components and devices, and/or methods for their preparation and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all of its respects, to every aspect of this invention. As such, the following objects can be viewed in the alternative with respect to any one aspect of this invention.

It can be an object of the present invention to provide one or more methods for nanocomposite preparation to prevent nanoparticle agglomeration problems associated with the prior art.

It can be another object of the present invention to provide an in situ polymerization technique using one or more metallocene catalyst components supported on a nanoparticle, with a range of available olefin monomers.

It can be another object of the present invention, alone or in conjunction with one of the preceding objectives, to provide a nanocomposite comprising a nanoparticle component homogeneously dispersed within a matrix of a high-strength, high-energy commodity polymer material of the sort used in the art with energy storage capacitors and insulators.

Other objects, features, benefits and advantages of the present invention will be apparent from this summary and the following descriptions of certain embodiments, and will be readily apparent to those skilled in the art having knowledge of various high energy nanocomposites and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

In part, the present application can be directed to a particulate composition comprising a substrate comprising a metal oxide component and an aluminum oxide component; and a metallocene olefin polymerization catalyst component coupled to such a substrate. Without limitation, such a substrate and/or particulate can be nano-dimensioned. In certain other embodiments, such a substrate and/or particulate composition can be micro-dimensioned.

In certain embodiments, a metal oxide can be but is not limited to binary and ternary metal oxides, such oxides as can comprise a dopant, and combinations thereof. In certain such embodiments, a metal oxide component can be selected from Al$_2$O$_3$, SiO$_2$, TiO$_2$, ZrO$_2$, BaTiO$_3$BaZrO$_3$, PbO$_3$, together with Pb(TiZr)O$_3$ and other such oxides comprising a dopant. Regardless, a metallocene component can be selected from any such polymerization catalyst known to those skilled in the art, made aware of this invention. Without limitation, such a metallocene component can be selected from EBIZrCl$_2$, CGCTiCl$_2$ and CpTiCl$_3$, as described more fully below, and structural variations thereof. Without limitation as to metal oxide and metallocene identity, such a composition can be provided in a polyolefin matrix.

In part, the present invention can also be directed to a composite comprising a nano-dimensioned substrate comprising a metal oxide component, an aluminum oxide component and a metallocene catalyst component; and a polyolefin component coupled thereto. In certain embodiments, a polyolefin component can be selected from $C_2$ to about $C_{12}$ polyalkylenes, substituted $C_2$ to about $C_{12}$ polyalkylenes, and copolymers thereof, such polyolefin components limited only by alkylene monomer (s) reactive with such a metallocene catalyst component under polymerization conditions of the sort described herein. In certain such embodiments, metallocene and metal oxide components can be as described above or illustrated elsewhere herein. Accordingly, with choice of alkylene monomer(s), such a polyolefin component can be select from isotactic polypropylene, a linear polyethylene, and a polystyrene and copolymers thereof.

In part, the present invention can also be directed to a commodity or bulk material composition comprising a polyolefin component and a nano-dimensioned or micro-dimensioned substrate component dispersed therein, with such a substrate component comprising a metal oxide component, an aluminum oxide component and metallocene catalyst component. Such metal oxide, aluminum oxide and metallocene components can be as described above. Without limitation as to substrate identity, volume fractions or percentages can range from about 0.05 percent to about 15 percent. Likewise, substrate dispersion can be substantially homogeneous on a nano- or microscale dimension. In certain such embodiments, a metal oxide component of such a substrate can have a shape about or substantially spherical or a shape about or substantially rod-like, as demonstrated below.

A polyolefin component of such a composition is limited only by monomer polymerization in the presence in such a metallocene catalyst. For instance, in certain embodiments, a polyolefin can be selected from $C_2$ to about $C_{12}$ polyalkylenes, substituted $C_2$ to about $C_{12}$ polyalkylenes, and copolymers thereof. Regardless, depending upon polyolefin and/or substrate component identity, such a composition can be present as a thin film and/or incorporated into a range of device structures, including but not limited to insulator devices. Alternatively, depending upon a particular composition, such materials can find utility in the context of cable insulation.

In part, the present invention can also be directed to a method of preparing a metal oxide-polyolefin nanocomposite. Such a method can comprise providing a substrate comprising a metal oxide component and a metallocene olefin polymerization catalyst component coupled thereto; and contacting such a substrate with an olefin component, such contact for a time and/or an amount sufficient to at least partially polymerize an olefin on such a substrate, to provide a nanocomposite. Without limitation, metal oxide, metallocene and/or olefin/alkylene components can be selected as described above. Depending upon olefin content and degree of polymerization, such a substrate component can have a volume percentage ranging from about 0.05 percent to about 15 percent. In certain, embodiments, increasing volume percent can be used to affect melt temperature, leak current density and/or relative permittivity of a resulting nanocomposite. In certain other embodiments, choice of metal oxide shape can be used to affect one or more composite physical characteristics. Without limitation, the relative permittivity of such a nanocomposite can be increased using a rod-shaped metal oxide component.

Illustrating yet another aspect thereof, the present invention can be directed to a method of using an aluminoxane component to moderate phase energy densities of a metal oxide-polyolefin composite. Such a method can comprise providing a metal oxide component as can be selected from binary and ternary metal oxides and such oxides comprising a dopant; contacting such a metal oxide component with an aluminoxane component for a time at least partially sufficient to provide an aluminum oxide coating on the metal oxide component; contacting such a coated metal oxide with a metallocene olefin polymerization catalyst component, to provide a nano- or micro-dimensioned substrate of the sort described above; and contacting such substrate with one or more olefin components, such contact for a time and/or an amount sufficient to at least partially polymerize the olefin(s) on such a substrate.

DETAILED DESCRIPTION OF THE DRAWINGS

FIG. 1. $^{13}C$ NMR spectrum of an isotactic-polypropylene nanocomposite (100 MHz, $C_2D_2Cl_4$, 130° C.).

Figure 2:
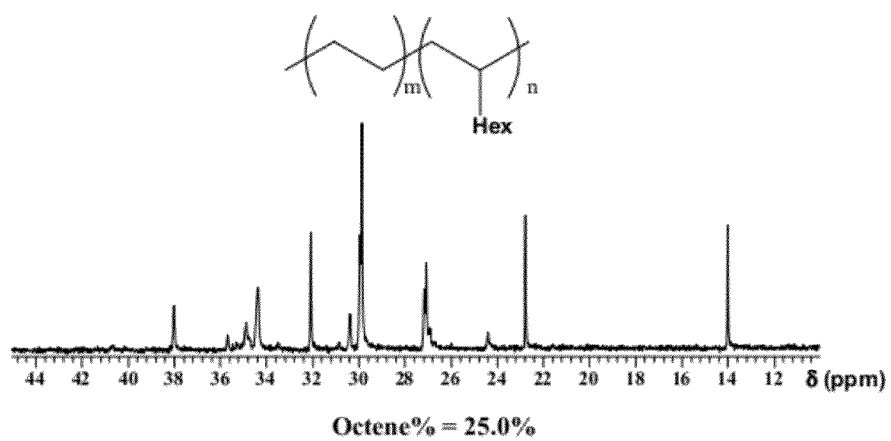

FIG. 2. $^{13}C$ NMR spectrum of a poly(ethylene-co-1-octene) nanocomposite (100 MHz, $C_2D_2Cl_4$, 130° C.).

Figure 3:
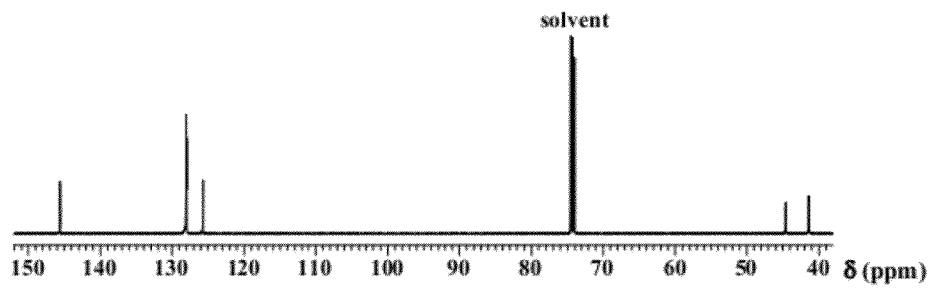

FIG. 3. $^{13}C$ NMR spectrum of a syndiotactic-polystyrene nanocomposite (100 MHz, $C_2D_2Cl_4$, 130° C.).

FIGS. 4A-B. Electron microscopic characterization of: (A) as-received pristine $ZrO_2$ (SEM) and (B) 7.4 vol % $ZrO_2$-$^{iso}$PP nanocomposite (TEM).

FIGS. 5A-b. Electron microscopic characterization of: (A) as-received pristine TZ3Y (SEM) and (B) 31.1 wt % TZ3Y-$^{iso}$PP nanocomposite (TEM).

FIGS. 6A-B. Electron microscopic characterization of: (A) as-received pristine TZ8Y (SEM) and (B) 39.2 wt % TZ8Y-$^{iso}$PP nanocomposite (TEM).

Figure 7:
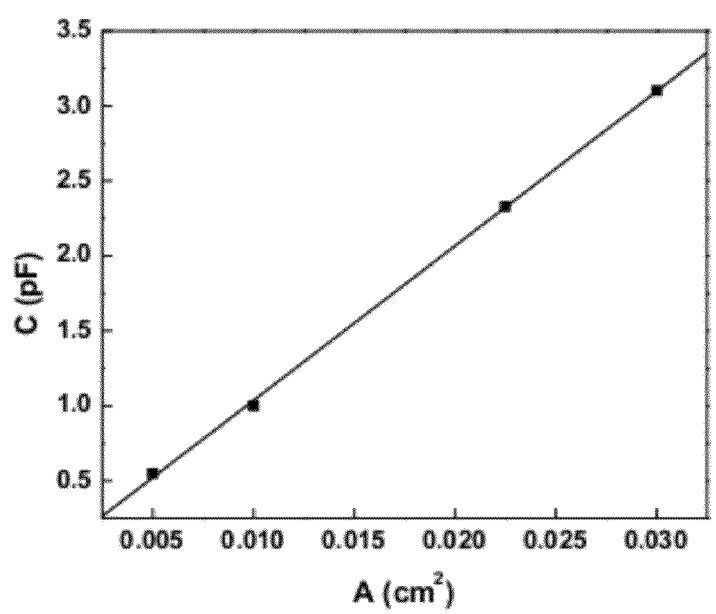

FIG. 7. Representative C (capacitance) vs. A (electrode area) plot for a 2.6 vol % $BaTiO_3$-$^{iso}$PP nanocomposite.

Figure 8A:
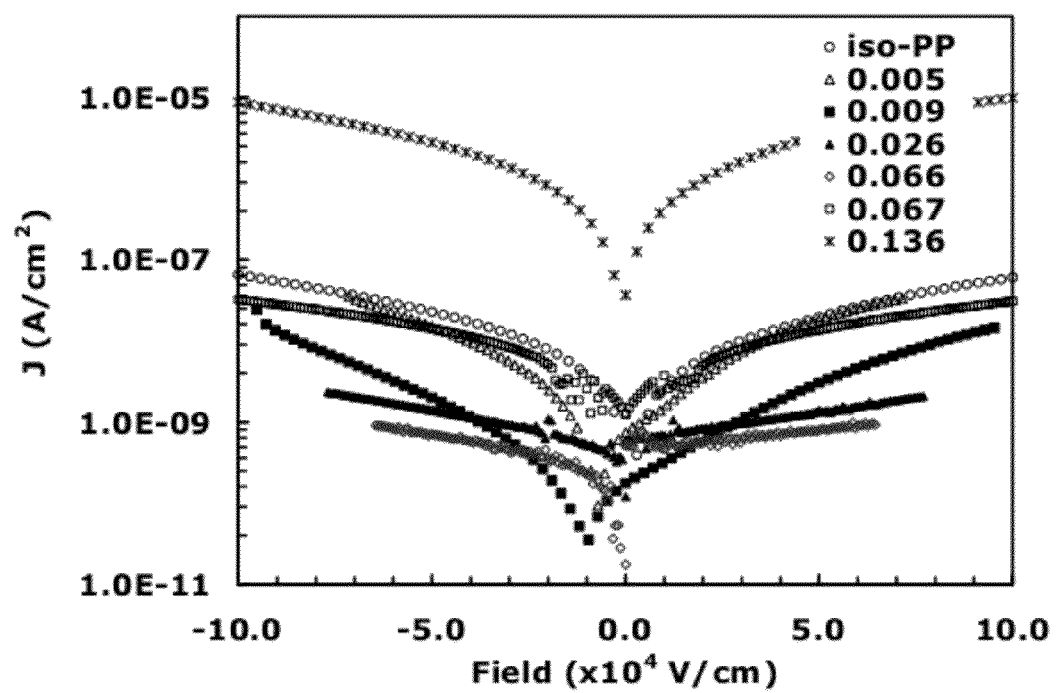

FIGS. 8A-C. Leakage current density vs. field measurement results for the nanocomposite MIS or MIM devices (legends are for the volume fraction of the inorganic particles): (A) n$^+$-Si/$BaTiO_3$-polypropylene/Au; (B) n$^+$-Si/sphere-$TiO_2$-polypropylene/Au; (C) Al/rod-$TiO_2$-polypropylene/Au.

Figure 9C:
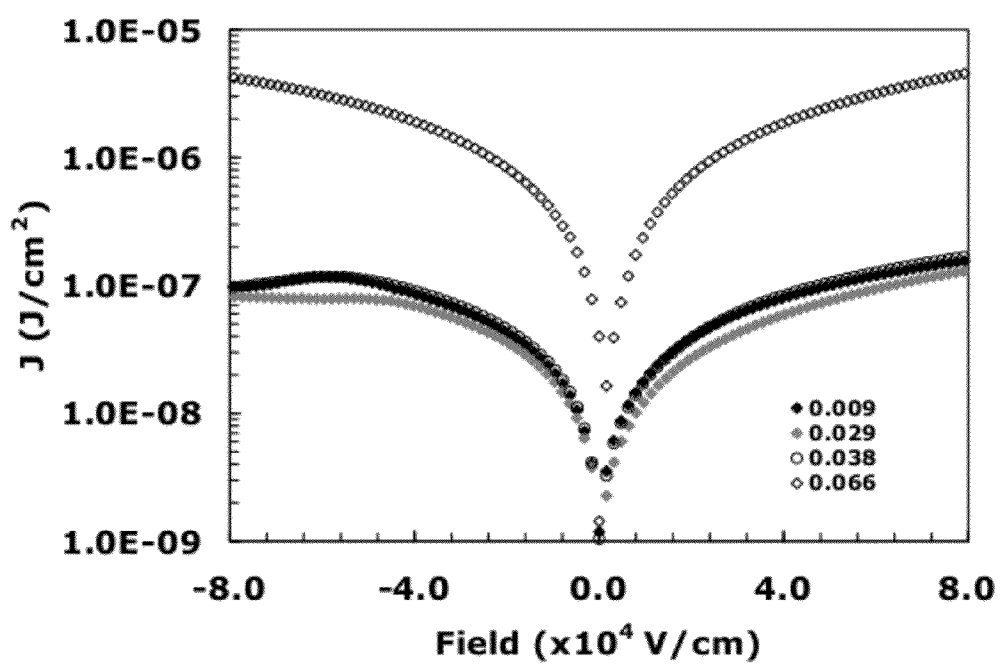

FIGS. 9A-C. Leakage current density vs. field measurement results for the nanocomposite MIS or MIM devices (legends are for the volume fraction of the inorganic particles): (A) Al/$ZrO_2$-polypropylene/Au; (B) Al/TZ3Y-polypropylene/Au; (C) Al/TZ8Y-polypropylene/Au.

Figure 10:
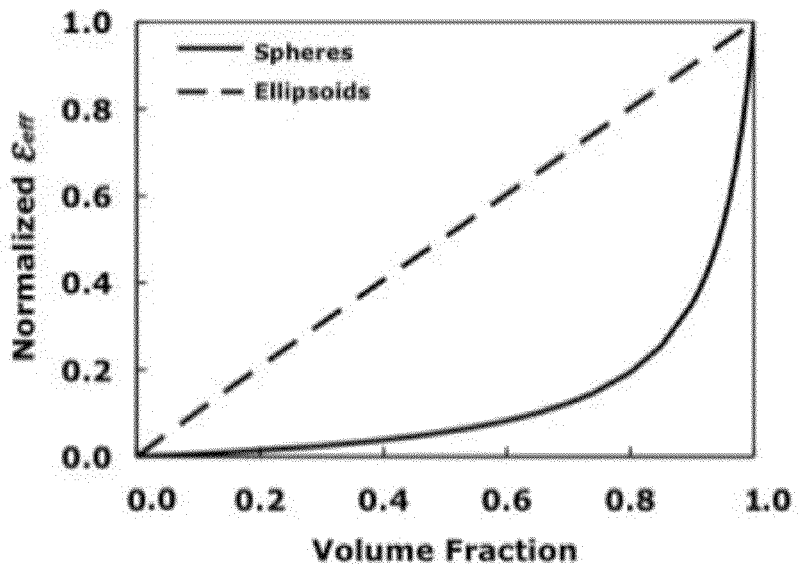

FIG. 10. Normalized effective permittivity ($\in_{eff}$-$\in_b$/$\in_a$-$\in_b$) for composite dielectrics of polypropylene with spherical inclusions (eq. 4), and with ellipsoidal inclusions (eq. 5).

Figure 11:
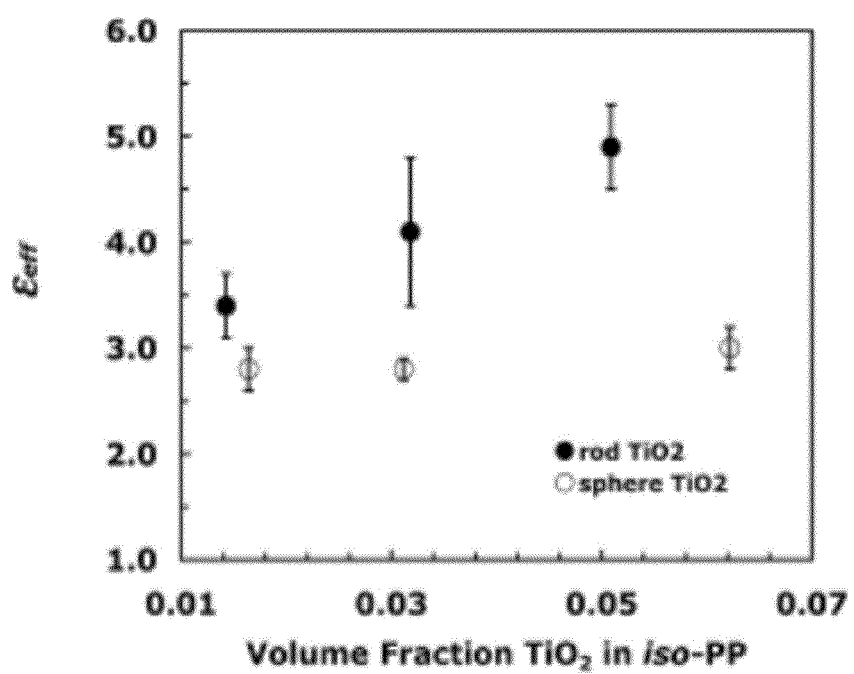

FIG. 11. Comparison of effective permittivities for spherical- and rod-shaped $TiO_2$ nanoparticle-polypropylene nanocomposites.

DETAILED DESCRIPTION OF CERTAIN EMBODIMENTS

Illustrating certain embodiments of this invention, high energy density $BaTiO_3$- and $TiO_2$-isotactic polypropylene nanocomposites were prepared via in situ metallocene polymerization. The resulting nanocomposites were found to have effective nanoparticle dispersion and to possess energy densities as high as 9.4 J/cm$^3$, as determined from relative permittivities and dielectric breakdown measurements. To demonstrate various other aspects of this invention, the scope of inorganic inclusion can be extended to include a broad variety of nanoparticles, with corresponding effects of nanoparticle identity and shape on the electrical/dielectric properties of the resulting nanocomposites. Likewise, the scope of metallocene polymerization catalysts and olefinic monomers can be extended (e.g., Chart 1) to enhance nanoparticle processability and thermal stability. Representative of a range such of embodiments, nanoparticle coating with methylaluminoxane (MAO) and subsequent in situ polymerization can be used effectively for effective dispersion, to realize high breakdown strengths, permittivities and energy storage densities.

Chart 1

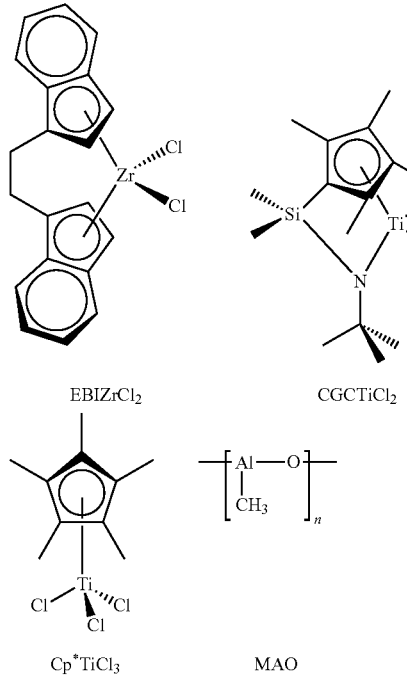

Accordingly, a series of 0-3 metal oxide-polyolefin nanocomposites was synthesized via in situ olefin polymerization using the metallocene catalysts $C_2$-symmetric dichloro[rac-ethylenebisindenyl]zirconium (IV) (EBIZrCl$_2$), Me$_2$Si($^t$BuN)($\eta^5$-C$_5$Me$_4$)TiCl$_2$(CGCTiCl$_2$), and ($\eta^5$-C$_5$Me$_5$)TiCl$_3$ (Cp*TiCl$_3$) immobilized on methylaluminoxane (MAO)-treated barium titanate (BaTiO$_3$), zirconium dioxide (ZrO$_2$), 3 mol % yttria-stabilized zirconia (TZ3Y), 8 mol % yttria-stabilized zirconia (TZ8Y), sphere-shaped titanium dioxide (TiO$_2$), and rod-shaped TiO$_2$ nanoparticles. The resulting composite materials were characterized by X-ray diffraction (XRD), scanning electron microscopy (SEM), transmission electron microscopy (TEM), $^{13}$C nuclear magnetic resonance (NMR) spectroscopy, and differential scanning calorimetry (DSC). It was shown by TEM that the nanoparticles are well-dispersed in the polymer matrix and each individual nanoparticle is surrounded by polymer. Electrical measurements reveal that most of the nanocomposites have leakage current densities ~$10^{-8}$-$10^{-6}$ A/cm$^2$, and the relative permittivities of the nanocomposites increase as the nanoparticle volume fraction increases, with measured values as high as 6.1. At the same volume fraction, rod-shaped TiO$_2$ nanoparticle-polypropylene nanocomposites exhibit greater relative permittivities than the corresponding sphere-shaped TiO$_2$ nanoparticle-polypropylene nanocomposites. The energy densities of these nanocomposites are estimated to be as high as 9.4 J/cm$^3$.

As one of the most commonly used polymers in large-scale power capacitors, isotactic polypropylene offers greater stiffness, lower shrinkage, and less deterioration of the dielectric properties at higher temperatures than other grade polypropylenes. Therefore, the $C_2$-symmetric metallocene catalyst dichloro[rac-ethylenebisindenyl]zirconium (IV) (EBIZrCl$_2$), known for highly isospecific olefin polymerization, was selected to demonstrate immobilization on the surfaces of MAO-treated metal oxide nanoparticles, to synthesize metal oxide-isotactic polypropylene nanocomposites.

X-ray diffraction (XRD) linewidth analyses using the Scherrer equation indicate that the microstructures and coherence lengths of the individual nanoparticles remain largely unchanged upon deagglomerization (Table 1). (See, Jenkins, R.; Snyder, R. L. In Introduction to X-ray Powder Diffractometry; Winefordner, J. D., Ed.; Wiley: New York, 1996; pp 89-91; and Scherrer, P. Gött. Nachr. 1918, 2, 98-100.) $^{13}$C NMR spectroscopy (FIG. 1) shows that the present polypropylenes are highly isotactic, as evidenced by the isotacticity index ([mmmm]=83%). (See, Busico, V.; Cipullo, R.; Monaco, G.; Vacatello, M. Macromolecules 1997, 30, 6251-6263; Busico, V.; Cipullo, R.; Corradini, P.; Landriani, L.; Vacatello, M.; Segre, A. L. Macromolecules 1995, 28, 1887-1892; and Zambelli, A.; Dorman, D. E.; Brewster, A. I. R.; Bovey, F. A. Macromolecules 1973, 6, 925-926.) DSC confirms the absence of extensive amorphous regions in the composites since only isotactic polypropylene melting features (142-147° C.) are detected. XRD data for the nanocomposites also reveal the presence of monoclinic a phase crystalline isotactic polypropylene (2θ=14.2, 17.0, 18.6, and 21.8°). It is found that the melting temperatures of the nanocomposites generally increase as the nanoparticle loading increases (Table 2), possibly due to attractive interactions between the nanoparticles and the crystalline regions of the isotactic polypropylene.

TABLE 1

XRD Linewidth Analysis Results of the Nanocomposites

| Powder | 2θ (deg) | FWHM (deg) | Crystallite Size (nm) |
|---|---|---|---|
| BaTiO$_3$-polypropylene | 31.649 | 0.271 | 32.8 |
| BaTiO$_3$ | 31.412 | 0.254 | 35.6 |
| TiO$_2$-polypropylene | 25.358 | 0.361 | 23.5 |
| TiO$_2$ | 25.360 | 0.317 | 27.1 |

Crystallite size (L) is calculated using the Scherrer equation L=0.9λ/B cos θ$_B$(λ=x-ray wavelength, B=full-width-at-half maximum (FWHM) of the diffraction peak, and θ$_B$=Bragg angle).

Linear low-density polyethylene (LLDPE) is another polymer that is widely used in power capacitors. Compared to isotactic polypropylene, the chain branching in the LLDPE affords better processability. Therefore, the sterically open constrained geometry catalyst Me$_2$Si($^t$BuN)($\eta^5$-C$_5$Me$_4$)TiCl$_2$(CGCTiCl$_2$) was utilized to synthesize BaTiO$_3$-LLDPE nanocomposites via in situ ethylene+1-octene copolymerization. FIG. 2 presents a representative $^{13}$C NMR spectrum of the nanocomposite, with the 1-octene incorporation level calculated to be 25.0 mol %. (See, Qiu, X.; Redwine, D.; Gobbi, G.; Nuamthanom, A.; Rinaldi, P. L. Macromolecules 2007, 40, ASAP.) DSC measurements also confirms the formation of LLDPE, which has a typical melting temperature of 125.3° C.

Syndiotactic polystyrene has greater heat resistance than isotactic polypropylene, which can only operate below 85° C. when incorporated into film capacitors. Employing the same protocol as EBIZrCl$_2$, the half-metallocene catalyst C$_P$*TiCl$_3$[25] was immobilized on MAO-treated ZrO$_2$ nanoparticles. Subsequent in situ styrene polymerization affords ZrO$_2$-syndiotactic polystyrene nanocomposites. A representative $^{13}$C NMR spectrum is shown in FIG. 3. The characteristic single resonance near δ=145.6 ppm for the ipso phenyl carbon atom confirms the production of syndiotactic polystyrene, which is further substantiated by the melting temperature (267.0° C.) as measured by DSC.

During the course of in situ metallocene polymerization, the polymer chains propagating at the nanoparticle-immobilized metallocene catalytic centers may be expected to create large local hydrostatic pressures and thus help to disrupt the nanoparticle agglomeration. Such results are confirmed by the comparative electron microscopic characterization of the as-received pristine nanoparticles and the resulting nanocomposites. As can be seen from FIGS. 4, 5, and 6, the as-received pristine nanoparticles evidence very high levels of agglomeration, however, for the polyolefin nanocomposites, the agglomeration of the nanoparticles is shown to be disrupted and each individual nanoparticle is surrounded by a layer of matrix polymer.

To assess nanocomposite permittivity properties, metal-insulator-metal (MIM) or metal-insulator-semiconductor (MIS) devices for nanocomposite electrical measurements were fabricated by first doctor-blading nanocomposite films onto aluminum or n$^+$-Si substrates, followed by vacuum-depositing top gold electrodes through shadow masks. The capacitances were measured at 1 kHz, a sufficiently high frequency to avoid the complications arising from conduction and interfacial polarization effects. After the capacitance was measured at multiple locations on the nanocomposite film surface using different electrode areas, the relative permittivity ($\in_r$) of the nanocomposite was derived using eq. 2, where C is the capacitance, A is the electrode area, $$C = \frac{\varepsilon_0 \varepsilon_r A}{d} \qquad (2)$$

$\in_0$ is the vacuum permittivity (8.8542×10$^{-12}$ F/m), $\in_r$ is relative permittivity, and d is the nanocomposite film thickness. FIG. 7 shows a representative capacitance vs. electrode area plot, the linearity of which indicates the good dielectric uniformity of the nanocomposite film.

Table 2 summarizes the relative permittivity measurement results for the present nanocomposites. As the nanoparticle loading increases, the relative permittivity of the nanocomposites also increases as predicted by the effective medium approximation. At the same volume fraction, rod-shaped $TiO_2$-polypropylene nanocomposites exhibit significantly greater relative permittivities than those prepared with sphere-shaped $TiO_2$ nanoparticles (compare entries 1-4 versus 11-13) under identical reaction conditions. Without limitation, this shape effect is thought to arise from the different depolarization factors for different inclusion particle geometries.

TABLE 2

Electrical Characterization Results for Metal Oxide-polypropylene Nanocomposites[a]

| Entry | Composite | Nanoparticle vol %[b] | $T_m$[c] (° C.) | Permittivity[d] | Breakdown Field (kV) | Film Thickness[e] (μm) | Energy Density[f] (J/cm$^3$) |
|---|---|---|---|---|---|---|---|
| 1 | $^{iso}$PP—$^s$TiO$_2$ | 0.1% | 135.2 | 2.2 ± 0.1 | >10.0 | 36 | >0.8 ± 0.1 |
| 2 | $^{iso}$PP—$^s$TiO$_2$ | 1.6% | 142.4 | 2.8 ± 0.2 | 9.5 | 23 | 2.1 ± 0.2 |
| 3 | $^{iso}$PP—$^s$TiO$_2$ | 3.1% | 142.6 | 2.8 ± 0.1 | 7.5 | 27 | 1.0 ± 0.1 |
| 4 | $^{iso}$PP—$^s$TiO$_2$ | 6.2% | 144.8 | 3.0 ± 0.2 | 9.3 | 20 | 2.8 ± 0.2 |
| 5 | $^{iso}$PP—BaTiO$_3$ | 0.5% | 136.8 | 2.7 ± 0.1 | 8.8 | 28 | 1.2 ± 0.1 |
| 6 | $^{iso}$PP—BaTiO$_3$ | 0.9% | 142.8 | 3.1 ± 1.2 | >10.0 | 21 | >4.0 ± 0.6 |
| 7 | $^{iso}$PP—BaTiO$_3$ | 2.6% | 142.1 | 2.7 ± 0.2 | 9.8 | 25 | 1.8 ± 0.2 |
| 8 | $^{iso}$PP—BaTiO$_3$ | 5.2% | 145.6 | 2.9 ± 1.0 | 8.2 | 30 | 1.0 ± 0.3 |
| 9 | $^{iso}$PP—BaTiO$_3$ | 6.7% | 144.8 | 5.1 ± 1.7 | 9.0 | 22 | 3.7 ± 1.2 |
| 10 | $^{iso}$PP—BaTiO$_3$ | 13.6% | 144.8 | 6.1 ± 0.9 | >10.0 | 17 | >9.4 ± 1.3 |
| 11 | $^{iso}$PP—$^r$TiO$_2$ | 1.4% | 139.7 | 3.4 ± 0.3 | | | |
| 12 | $^{iso}$PP—$^r$TiO$_2$ | 3.2% | 142.4 | 4.1 ± 0.7 | | | |
| 13 | $^{iso}$PP—$^r$TiO$_2$ | 5.1% | 143.7 | 4.9 ± 0.4 | | | |
| 14 | $^{iso}$PP—ZrO$_2$ | 1.6% | 142.9 | 1.7 ± 0.3 | | | |
| 15 | $^{iso}$PP—ZrO$_2$ | 3.9% | 145.2 | 2.0 ± 0.4 | | | |
| 16 | $^{iso}$PP—ZrO$_2$ | 7.5% | 144.9 | 4.8 ± 1.1 | | | |
| 17 | $^{iso}$PP—ZrO$_2$ | 9.4% | 144.4 | 5.1 ± 1.3 | | | |
| 18 | $^{iso}$PP-TZ3Y | 1.1% | 142.9 | 1.1 ± 0.1 | | | |
| 19 | $^{iso}$PP-TZ3Y | 3.1% | 143.5 | 1.8 ± 0.2 | | | |
| 20 | $^{iso}$PP-TZ3Y | 4.3% | 143.8 | 2.0 ± 0.2 | | | |
| 21 | $^{iso}$PP-TZ3Y | 6.7% | 144.9 | 2.7 ± 0.2 | | | |
| 22 | $^{iso}$PP-TZ8Y | 0.9% | 142.9 | 1.4 ± 0.1 | | | |
| 23 | $^{iso}$PP-TZ8Y | 2.9% | 143.2 | 1.8 ± 0.1 | | | |
| 24 | $^{iso}$PP-TZ8Y | 3.8% | 143.2 | 2.0 ± 0.2 | | | |
| 25 | $^{iso}$PP-TZ8Y | 6.6% | 146.2 | 2.4 ± 0.4 | | | |

[a]Polymerizations carried out in 50 mL of toluene under 1.0 atm of propylene at 20° C.
[b]From elemental analysis.
[c]From differential scanning calorimetry.
[d]Derived from capacitance measurement.
[e]Film thicknesses measured using profilometry
[f]Energy density (U) calculated from U = 0.5$\varepsilon_0\varepsilon_r E_b^2$ ($\varepsilon$0, vacuum permittivity; $\varepsilon$r, relative permittivity; and $E_b$, breakdown field (MV/cm) calculated by dividing breakdown voltage by film thickness).

The leakage current densities of all the nanocomposite films prepared in this investigation (FIGS. 8 and 9) are mostly within the range $10^{-8}$-$10^{-6}$ A/cm$^2$ at 100 V, indicating that the aforementioned nanocomposites are all excellent insulators. As the nanoparticle loading increases, most of the nanocomposites exhibit lower leakage current densities, presumably a result of modified charge transport and interruption of the crystalline conduction pathways within the composite structure. However, at the highest nanoparticle loadings, the nanocomposites have the largest leakage current densities, simply because the weight percentages of the nanoparticles have reached the respective percolation thresholds. Increasing the relative permittivity of the nanocomposite by changing the shape of the inclusion does not appear to compromise the good insulating properties of these composites.

The present measured breakdown strengths for some of the nanocomposites are invariably ~3-6 MV/cm, indicating that metal oxide nanoparticle inclusion does not significantly depress the polymer dielectric breakdown strength. Without limitation, in a well-dispersed nanoparticle composite, interfaces between the ceramic nanoparticles and polymer phases can create effective electron scatterers and trapping centers, thus reducing the breakdown probability. Moreover, well-dispersed ceramic nanoparticles may block degradation tree growth and can increase the long-term breakdown strength. Energy densities of the present nanocomposites are estimated to be as high as 9.4 J/cm$^3$, which rivals or exceeds those reported for conventional ceramic, polymer, and composite dielectrics.

A challenge in the preparation of inorganic metal oxide-polyolefin nanocomposites is the general phase incompatibility between inorganic polar metal oxide inclusions and the non-polar organic host materials. For example, ferroelectric metal oxides are highly hydrophilic, while isotactic polypropylene is highly hydrophobic. Simple admixing of the two constituents negligibly disrupts the extensive nanoparticle agglomeration nor affects the um-scale or larger phase separation, which can lead to local dielectric breakdown and degrade the nanocomposite electrical properties. In contrast, the present in situ supported metallocene polymerization approach minimizes these deficiencies by achieving homogeneous nanoscale dispersion of the metal oxide phase: each individual nanoparticle is surrounded by polymer chains propagating in situ from the surface-immobilized metallocenium catalyst centers, and thus offers improved dielectric properties (energy densities as high as 9.4 J/cm$^3$).

However, such nanocomposites can have very large contrasts in relative permittivities between host and guest materials, leading to a large disparity in the electric fields within the constituent phases, thus preventing the realization of maximum energy densities for both constituents simultaneously. For representative BaTiO$_3$-polypropylene nanocomposites, however, the achieved energy density is as high as 9.4 J/cm$^3$ although the materials permittivity ratio approaches ~1000:1. Without limitation to any one theory or mode of operation, the Al$_2$O$_3$ ($\epsilon_r$≈10) layer (thickness ~1 nm, estimated from ICP-OES analysis) evolving from ambient exposure of the MAO coating, can act as a dielectric buffer layer between the high permittivity BaTiO$_3$ nanoparticles ($\epsilon_r$≈2000) and low permittivity polypropylene ($\epsilon_r$≈2.2).

The most common effective medium models for permittivity are derived for the simple case of a spherical dielectric inclusion embedded in a sphere of the host material. However, most materials do not occur naturally as spheres, and therefore effective medium models for other shapes have also been developed. (See, e.g., Brosseau, C.; Beroual, A.; Boudida, A. *J. Appl. Phys.* 2000, 88, 7278-7288; Green, N. G.; Jones, T. B. *J. Phys. D. Appl. Phys.* 2007, 40, 78-85.) Simple analytical solutions for the effective permittivity ($\epsilon_{eff}$) can be derived only for ellipsoids, whereas all other shapes require numerical solutions. Depolarization factors along each semi-axis of the ellipsoid ($N_x$, $N_y$, $N_z$), where $N_x$=$N_y$=$N_z$=1, can be used to estimate geometrical effects. The depolarization factors are calculated from integrals, e.g., eq. 3, where $a_x$, $a_y$, $a_z$ are the semi-axes of the ellipsoid. For spheres, all three $$N_x = \frac{a_x a_y a_z}{2} \int_0^\infty \frac{1}{(s+a_x^2)\sqrt{(s+a_x^2)(s+a_y^2)(s+a_z^2)}} ds \quad (3)$$

depolarization factors are equal (1/3, 1/3, 1/3), however, for ellipsoids the depolarization factors are, 0, 1/2, 1/2, respectively and for discs, 1, 0, 0, respectively. Since the dielectric energy is a stationary functional of the electric field, the result is that permittivities arising from spherical inclusions are the lowest and any deviation from the spherical shape results in an increase in the effective permittivity of the mixture at the same volume fraction. These observations prompted study of TiO$_2$-isotactic polypropylene nanocomposites with different inclusion shapes.

In FIG. 10, the calculated effective permittivities of the nanocomposites containing spherical inclusions to the nanocomposites are compared with ellipsoidal inclusions. For the case of spherical inclusions, the effective permittivities are calculated using the Maxwell-Garnett effective medium theory (eq. 4), and for the case of ellipsoidal inclusions, $$\varepsilon_{eff} = \varepsilon_b \frac{\varepsilon_a + 2\varepsilon_b + 2f_a(\varepsilon_a - \varepsilon_b)}{\varepsilon_a + 2\varepsilon_b - f_a(\varepsilon_a - \varepsilon_b)} \quad (4)$$

$$\varepsilon_{eff} = \varepsilon_b + \frac{f_a}{3}(\varepsilon_a - \varepsilon_b) \sum_{j=x,y,z} \frac{\varepsilon_{eff}}{\varepsilon_{eff} + N_j(\varepsilon_a - \varepsilon_{eff})} \quad (5)$$

the effective permittivities are calculated using the Polder-Van Santen formalism (eq. 5), where $\epsilon_a$ is the relative permittivity of the TiO$_2$ inclusions, $\epsilon_b$ is the relative permittivity of isotactic polypropylene, $f_a$ is the volume fraction of TiO$_2$ in the polymer, and $N_j$ is for the depolarization factors. (See, e,g., Busico, V.; Cipullo, R.; Monaco, G.; Vacatello, M. *Macromolecules* 1997, 30, 6251-6263.) As expected, the effective medium theory predicts that composites containing ellipsoidal inclusions will have larger effective permittivities at low volume loadings than composites containing spherical inclusions.

The experimental results are plotted in FIG. 11. Remarkably, the effective permittivities for spherical inclusions remain constant over a small range of volume fractions, exactly as the Maxwell-Garnett equation predicts (FIG. 10). In marked contrast, the effective permittivity of composites having inclusions with ellipsoidal shapes increases rapidly with increasing inclusion volume fraction, which is again similar to trend predicted for ellipsoidal inclusions using eq. 5 (FIG. 10).

EXAMPLES OF THE INVENTION

Materials and Methods. All manipulations of air-sensitive materials were performed with rigorous exclusion of oxygen and moisture in flamed Schlenk-type glassware on a dual-manifold Schlenk line or interfaced to a high-vacuum line ($10^{-5}$ Torr), or in a dinitrogen-filled Vacuum Atmospheres glove box with a high capacity recirculator (<1 ppm $O_2$ and $H_2O$). Propylene (Matheson, polymerization grade) was purified by passage through a supported MnO oxygen-removal column and an activated Davison 4 Å molecular sieve column. Toluene was dried using an activated alumina column and Q-5 columns according to the method described in literature, and was additionally vacuum-transferred from Na/K alloy and stored in Teflon-valve sealed bulbs for polymerization manipulations. $BaTiO_3$ and $TiO_2$ nanoparticles were kindly provided by Prof. Fatih Dogan (University of Missouri, Rolla) and Prof. Thomas Shrout (Penn State University), respectively. $ZrO_2$ nanoparticles were purchased from Aldrich. The reagents 3 mol % yttria-stabilized zirconia (TZ3Y) and 8 mol % yttria-stabilized zirconia (TZ8Y) nanoparticles were purchased from Tosoh, Inc. $TiO_2$ nanorods were purchased from Reade Advanced Materials, Riverside, R.I. All of the nanoparticles were dried on a high vacuum line ($10^{-5}$ Torr) at 80° C. overnight to remove the surface-bound water, known to adversely affect the dielectric breakdown performance. The deuterated solvent 1,1,2,2-tetrachloroethane-$d_2$ was purchased from Cambridge Isotope Laboratories ($\geqq 99$ atom % D) and used as received. Methylaluminoxane (MAO; Aldrich) was purified by removing all the volatiles in vacuo from a 1.0 M solution in toluene. The reagent dichloro [rac-ethylenebisindenyl]zirconium (IV) ($EBIZrCl_2$) was purchased from Aldrich and used as received. $n^+$-Si wafers (rms roughness≈0.5 nm) were obtained from Montco Silicon Tech (Spring City, Pa.) and cleaned according to standard procedures. Aluminum substrates were purchased from McMaster-Carr (Chicago, Ill.) and cleaned according to standard procedures.

Physical and Analytical Measurements. NMR spectra were recorded on a Varian Innova 400 (FT 400 MHz, $^1H$; 100 MHz, $^{13}C$) spectrometer. Chemical shifts ($\delta$) for $^{13}C$ spectra were referenced using internal solvent resonances and are reported relative to tetramethylsilane. $^{13}C$ NMR assays of polymer microstructure were conducted in 1,1,2,2-tetrachloroethane-$d_2$ containing 0.05 M $Cr(acac)_3$ at 130° C. Resonances were assigned according to the literature for stereoregular polypropylenes. Elemental analyses were performed by Midwest Microlabs, LLC, Indianapolis, Ind. Inductively coupled plasma-optical emission spectroscopy (ICP-OES) analyses were performed by Galbraith Laboratories, Inc., Knoxville, Tenn. The thickness of the dielectric film was measured with a Tencor P-10 step profilometer and used to calculate the dielectric constant and breakdown strength of the sample. X-ray powder diffraction patterns were recorded on a Rigaku DMAX-A diffractometer with Ni-filtered Cu Kα radiation (1.54184 Å). Pristine ceramic nanoparticles and composite microstructures were examined with a FEI Quanta sFEG environmental scanning electron microscope with an accelerating voltage of 30 kV. Transmission electron microscopy was performed on a Hitachi H-8100 TEM with an accelerating voltage of 200 kV. Composite melting temperatures were measured on a TA Instruments 2920 temperature modulated differential scanning calorimeter. Typically, ca. 10 mg samples were examined, and a ramp rate of 10° C./min was used to measure the melting point. To erase thermal history effects, all samples were subjected to two melt-freeze cycles. The data from the second melt-freeze cycle are presented here.

Electrical Measurements. Gold electrodes for metal-insulator-semiconductor (MIS) devices were vacuum-deposited through shadow masks at $(3-4) \times 10^{-6}$ Torr (500 Å, 0.2-0.5 Å/s). Direct current MIS leakage current measurements were performed using Keithley 6430 sub-femtoamp remote source meter and a Keithley 2400 source meter using a locally written LABVIEW program and general purpose interface bus communication. A digital capacitance meter (Model 3000, GLK Instruments, San Diego) was used for capacitance measurements. All measurements were performed under ambient conditions. Dielectric breakdown strength measurements were carried out with a high-voltage amplifier (TREK 30/20A, TREK, Inc., Medina, N.Y.), and the experimental parameters were: ramp rate, 1,000 V/S; peak voltage, 30,000 V; ext. amplifier, 3,000; temperature, room temperature.

With reference to the following representative examples, any metal oxide component, metallocene catalyst component, aluminoxane component and olefin monomer component of the sort described herein can be used interchangeably with any one of the other. Accordingly, the general procedures of examples 1-2 were used to prepare the range of nanocomposites referenced in conjunction with the corresponding figures, such procedures as can be modified by those skilled in the art made aware of this invention. As such, the embodiments of example 3 were also prepared using such procedures (corresponding figures and data not shown).

Example 1

Representative immobilization of Metallocene Catalysts on Metal Oxide Nanoparticles. In the glovebox, 2.0 g nanoparticles, 200 mg MAO, and 50 mL dry toluene were loaded into a predried 100 mL Schlenk flask. Upon stirring, the mixture turned into a very fine slurry. The slurry was next subjected to alternating sonication and vigorous stirring for 2 days with constant removal of evolving $CH_4$. Next, the nanoparticles were collected by filtration and washed with fresh toluene (50 mL×4) to remove any residual MAO. Then, 200 mg metallocene catalyst was loaded in the flask with 50 mL toluene. The color of the nanoparticles immediately turned purple. The slurry mixture was again subjected to alternating sonication and vigorous stirring overnight. The nanoparticles were then collected by filtration and washed with fresh toluene until the color of the toluene remained colorless. The nanoparticles were dried on the high-vacuum line overnight and stored in the glovebox at –40° C.

Example 2

Representative Synthesis of Nanocomposites via In Situ Propylene Polymerization. In the glovebox, a 250 mL roundbottom three-neck Morton flask, which had been dried at 160° C. overnight and equipped with a large magnetic stirring bar, was charged with 50 mL dry toluene, 200 mg functionalized nanoparticles, and 50 mg MAO. The assembled flask was removed from the glovebox and the contents were subjected to sonication for 30 min with vigorous stirring. The flask was then attached to a high vacuum line ($10^{-5}$ Torr), freeze-pump-thaw degassed, equilibrated at the desired reaction temperature using an external bath, and saturated with 1.0 atm (pressure control using a mercury bubbler) of rigorously purified propylene while vigorously stirring. After a measured time interval, the polymerization was quenched by the addition of 5 mL methanol, and the reaction mixture was then poured into 800 mL of methanol. The composite was allowed to fully precipitate overnight and was then collected by filtration, washed with fresh methanol, and dried on the high vacuum line overnight to constant weight.

Example 3

More specifically, with reference to the preceeding, $BaTiO_3$ and $TiO_2$ 40 nm nanoparticles were dried on a high-vacuum line to remove surface-bound water, known to adversely affect dielectric breakdown performance. Nanocomposites were then synthesized via sequential nanoparticle MAO functionalization, catalyst immobilization/activation, and in situ isotactic propylene polymerization (Schemes 1 and 2). The first step is the anchoring MAO onto the nanoparticle surfaces via surface hydroxyl group reaction to form covalent Al—O bonds. Anchored MAO functions as a cocatalyst to activate the metallocene, and in addition, the hydro- $ZrCl_2$ to afford surface-anchored, polymerization-active species. $EBIZrCl_2$ is known to produce highly isotactic polypropylene, which, in conventional capacitors, affords enhanced mechanical and dielectric properties at elevated operating temperatures. Subsequent in situ polymerization yields isotactic polypropylene-$BaTiO_3$/$TiO_2$ nanocomposites, the compositions of which can be tuned by the polymerization conditions.

Scheme 1. Synthesis of Isotactic Polypropylene-Metal Oxide Nanocomposite

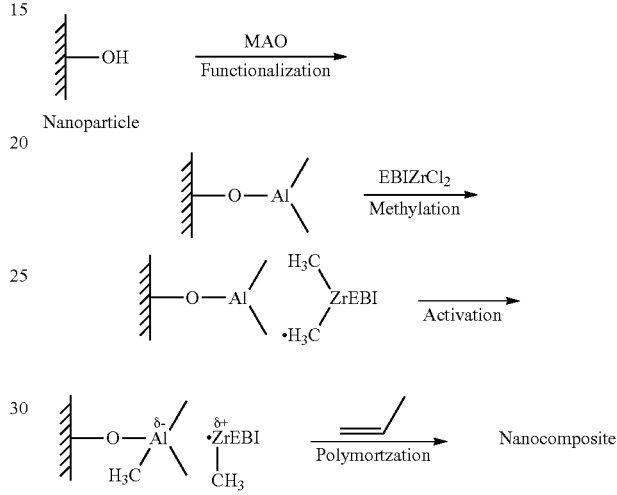

Scheme 2.

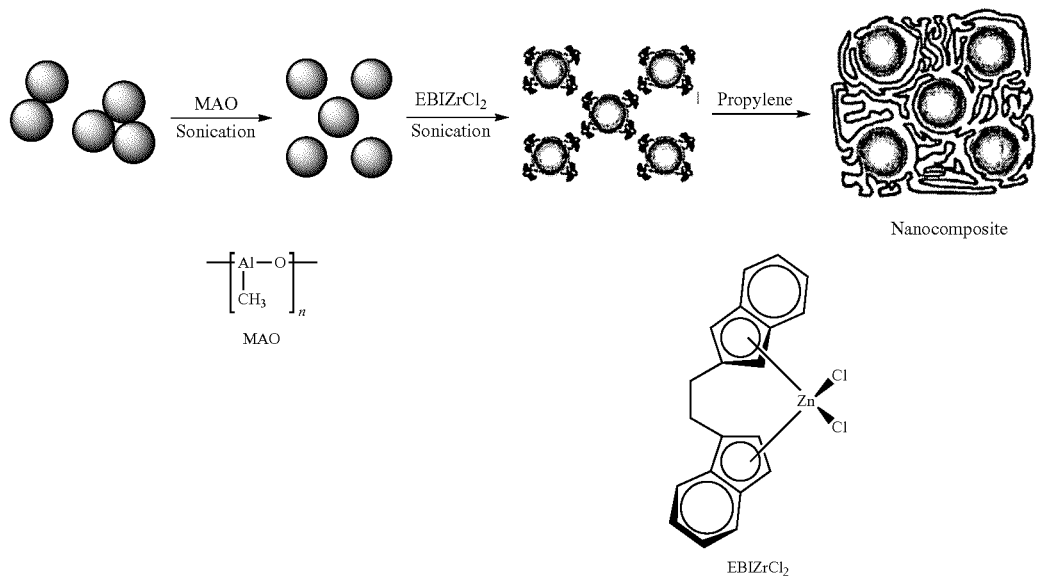

phobic MAO helps disrupt, in combination with ultrasonication, hydrophilic nanoparticle agglomeration in the hydrophobic reaction medium. After washing away unbound MAO, the MAO-coated nanoparticles are subjected to reaction with the $C_2$-symmetric polymerization catalyst EBI- As demonstrated, the present invention provides a range of well-dispersed metal oxide-polyolefin nanocomposites via a scalable, in situ supported metallocene olefin polymerization process. Leakage current densities ~$10^{-8}$-$10^{-6}$ $A/cm^2$ suggest that the nanocomposites are excellent insulators. The relative permittivity of the nanocomposites increases as the nanoparticle fraction increases. At the same inclusion loading, rod-shaped $TiO_2$ nanoparticle-polypropylene nanocomposites exhibit significantly greater relative permittivities than sphere-shaped $TiO_2$ nanoparticle-polypropylene nanocomposites. Energy densities of the $BaTiO_3$-polypropylene nanocomposites are found to be as high as 9.4 J/cm$^3$. This versatile approach offers effective control over composite composition and ready scalability. That is, simply by varying nanoparticle identity as well as their sizes, shapes, and the metallocene catalysts used, a wide array of nanocomposites with desired dielectric and mechanical properties can thus be catalytically synthesized in situ.

We claim:

1. A method of preparing a metal oxide-polyolefin nanocomposite, said method comprising:
providing a substrate comprising a nano-dimensioned metal oxide component and a metallocene olefin polymerization catalyst component coupled thereto, and
contacting said substrate with an olefin component, said contact for at least one of a time and in an amount sufficient to polymerize said olefin on said substrate, to provide said nanocomposite wherein said metal oxide component is homogenously dispersed throughout said nanocomposite such that said nanocomposite has an energy density of from between 2-9.4 J/cm$^3$.

2. The method of claim 1 wherein said metal oxide is selected from binary and ternary metal oxides and said oxides comprise a dopant; and said polyolefin component is selected from $C_2$ to $C_{12}$ polyalkylenes, substituted $C_2$ to $C_{12}$ polyalkylenes, and copolymers thereof.

3. The method of claim 2 wherein said substrate has a volume percentage ranging from 0.05 percent to 15 percent of the total nanocomposite.

4. The method of claim 3 wherein increasing said volume percent affects at least one of melt temperature, leak current density and relative permittivity of said nanocomposite.

5. The method of claim 1 wherein said metal oxide component has a shape selected from spherical and rod-like.

6. The method of claim 5 wherein increasing relative permittivity of said nanocomposite is achieved by selecting a rod-shaped metal oxide component.

7. A method of using an aluminoxane component to moderate phase energy densities of a metal oxide-polyolefin nanocomposite, said method comprising:
providing a metal oxide component, said metal oxide selected from binary and ternary metal oxides and said oxides comprising a dopant;
contacting said metal oxide component and an aluminoxane component for a time sufficient to provide an aluminum oxide coating on said metal oxide component;
contacting said coated metal oxide with a metallocene olefin polymerization catalyst component, to provide a nano-dimensioned substrate; and
contacting said substrate with an olefin component, said contact for at least one of a time and in an amount sufficient to polymerize said olefin on said substrate, wherein said metal oxide is homogenously dispersed throughout said metal oxide-polyolefin nanocomposite such that said metal oxide-polyolefin nanocomposite has an energy density of from between 2-9.4 J/cm$^3$.

* * * * *

UNITED STATES PATENT AND TRADEMARK OFFICE
CERTIFICATE OF CORRECTION

| | | |
|---|---|---|
| PATENT NO. | : 8,163,347 B2 | Page 1 of 1 |
| APPLICATION NO. | : 11/985930 | |
| DATED | : April 24, 2012 | |
| INVENTOR(S) | : Tobin J. Marks et al. | |

It is certified that error appears in the above-identified patent and that said Letters Patent is hereby corrected as shown below:

Column 1, Lines 8-10:

"The United States Government has certain rights to this invention pursuant to Grant No. N00014-05-1-0766 from the Office of Navel Research to Northwestern University." should be -- This invention was made with government support under grant number N00014-05-1-0766 awarded by the Office of Naval Research. The government has certain rights in the invention. --

Signed and Sealed this
Twenty-eighth Day of August, 2012

David J. Kappos
*Director of the United States Patent and Trademark Office*

UNITED STATES PATENT AND TRADEMARK OFFICE
CERTIFICATE OF CORRECTION

PATENT NO. : 8,163,347 B2  
APPLICATION NO. : 11/985930  
DATED : April 24, 2012  
INVENTOR(S) : Tobin J. Marks et al.

Page 1 of 1

It is certified that error appears in the above-identified patent and that said Letters Patent is hereby corrected as shown below:

In the Specification:

Column 1, lines 8-10
"The United States Government has certain rights to this invention pursuant to Grant No. N00014-05-1-0766 from the Office of Naval Research to Northwestern University." should read --This invention was made with government support under grant number N00014-05-1-0541 awarded by the Office of Naval Research. The government has certain rights in the invention.--

Signed and Sealed this
Twenty-first Day of April, 2015

Michelle K. Lee
*Director of the United States Patent and Trademark Office*